(12) United States Patent
Matsuhira

(10) Patent No.: US 8,277,007 B2
(45) Date of Patent: Oct. 2, 2012

(54) IMAGE PROCESSING APPARATUS

(75) Inventor: Masatoshi Matsuhira, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 258 days.

(21) Appl. No.: 12/838,269

(22) Filed: Jul. 16, 2010

(65) Prior Publication Data

US 2011/0012947 A1 Jan. 20, 2011

(30) Foreign Application Priority Data

Jul. 17, 2009 (JP) .................. 2009-169081

(51) Int. Cl.
*B41J 29/38* (2006.01)

(52) U.S. Cl. ............................................. 347/9; 347/14

(58) Field of Classification Search .................. None
See application file for complete search history.

(56) References Cited

FOREIGN PATENT DOCUMENTS

JP 2004-098636 A 4/2004

*Primary Examiner* — Stephen Meier
*Assistant Examiner* — Tracey McMillion
(74) *Attorney, Agent, or Firm* — Kilpatrick Townsend & Stockton LLP

(57) ABSTRACT

An image processing apparatus, connected to an ejection head in which a nozzle group configured of nozzles that eject CMY inks of the CMYK color system and a nozzle group configured of nozzles that eject K ink of the CMYK color system are formed at different nozzle densities, that converts inputted image data into print data and outputs the print data to the ejection head, and includes: a first processing device that inputs the image data; and a second processing device communicably connected to the first processing device via a predetermined communication interface.

4 Claims, 5 Drawing Sheets

IMAGE PROCESSING APPARATUS

This application claims priority to Japanese Patent Application No. 2009-169081, filed Jul. 17, 2009, the entirety of which is incorporated by reference herein.

BACKGROUND

1. Technical Field

The present invention relates to image processing apparatuses, and particularly relates to an image processing apparatus, connected to an ejection head in which a nozzle group configured of nozzles that eject CMY inks of the CMYK color system and a nozzle group configured of nozzles that eject K ink of the CMYK color system are formed at different nozzle densities, that converts inputted image data into print data and outputs the print data to the ejection head.

2. Related Art

As a past example of such an image processing apparatus, an apparatus including a shared memory provided with two buffer regions, a main data processing unit that interprets document data such as XHTML, generates raster data in which tone values are recorded on a pixel-by-pixel basis, and writes the raster data into a buffer region of the shared memory, and a sub data processing unit that generates print data by performing a halftone process and the like on the raster data written into the buffer region, has been proposed (for example, see JP-A-2004-98636). The disclosure proposes that with such an apparatus, the throughput of the apparatus as a whole can be improved by the sub data processing unit processing raster data written into one of the buffer regions and, during this period, the main data processing unit writing the raster data for the next print into the other buffer region.

With such data processing units, various data processes can normally be carried out by accessing an individual memory within that data processing unit itself; however, in the case of a configuration in which multiple data processing units can access a shared memory as described above, it is necessary to prevent the data processing units from accessing the same buffer region at the same time. For this reason, it is necessary to provide each of the data processing units with new functionality for limiting free access to the shared memory, which complicates the configuration of the apparatus, increases costs, and so on.

SUMMARY

An advantage of some aspects of the invention is to provide an image processing apparatus that improves the throughput of the apparatus as a whole by employing a simple configuration for the apparatus and distributing processes.

An image processing apparatus according to the invention employs the following configuration in order to achieve the aforementioned advantage.

An image processing apparatus according to an aspect of the invention is an image processing apparatus, connected to an ejection head in which a nozzle group configured of nozzles that eject CMY inks of the CMYK color system and a nozzle group configured of nozzles that eject K ink of the CMYK color system are formed at different nozzle densities, that converts inputted image data into print data and outputs the print data to the ejection head, and includes: a first processing device that inputs the image data; and a second processing device communicably connected to the first processing device via a predetermined communication interface. When the inputted image data is to be converted into color print data that uses CMYK inks, the first processing device transmits the K data of the CMYK multi-tone data to be processed to the second processing device via the predetermined communication interface and converts the CMY data through binarization performed at the pixel level, and when the inputted image data is to be converted into black-and-white print data that uses only K ink, the first processing device converts the K multi-tone data to be processed through binarization at the pixel level; and the second processing device converts the K multi-tone data transmitted from the first processing device through binarization at the pixel level.

The image processing apparatus according to the invention includes the first processing device that inputs the image data and the second processing device communicably connected to the first processing device via a predetermined communication interface. When the inputted image data is to be converted into color print data that uses CMYK inks, the first processing device transmits the K data of the CMYK multi-tone data to be processed to the second processing device via the predetermined communication interface and converts the CMY data through binarization performed at the pixel level, and when the inputted image data is to be converted into black-and-white print data that uses only K ink, the first processing device converts the K multi-tone data to be processed through binarization at the pixel level; and the second processing device converts the K multi-tone data transmitted from the first processing device through binarization at the pixel level. Through this, using a simple configuration in which the first processing device and the second processing device are connected simply by the predetermined communication interface, the respective processing devices can execute processes independently from each other. Accordingly, the CMY data processing and the K data processing can be distributed between the respective processing devices and the respective processes can then be carried out in parallel, when converting into color print data. In particular, the CMY data and K data have different numbers of pixels due to differences in the nozzle densities, and thus the processing efficiency can be increased by distributing the pixel-level binarization processes. As a result, the throughput of the apparatus as a whole can be improved. Furthermore, when converting into black-and-white data, the K data can be efficiently processed by the first processing device, without transmitting the K data to the second processing device.

In the image processing apparatus of the invention, the configuration can be implemented in such a manner that the first processing device transmits the K data after compressing the K data, and the second processing device converts the K data after decompressing the compressed K data. Doing so makes it possible to reduce the amount of time required to transmit the K data. In addition, in the image processing apparatus of the invention according to this aspect, the configuration can be implemented in such a manner that the first processing device compresses the K data using a lossless compression technique. Doing so enables the data to be transmitted without an accompanying drop in image quality.

Furthermore, in the image processing apparatus according to the invention, the configuration can be implemented in such a manner that in the ejection head, the K nozzle group is formed so as to have a higher density than the CMY nozzle group. In the image processing apparatus of the invention according to this aspect, the configuration can be implemented in such a manner that the first processing device converts the inputted image data into the CMYK multi-tone data to be processed at a resolution corresponding to the nozzle density of the K nozzle group, and converts the resolution of the CMY data to a resolution corresponding to the nozzle density of the CMY nozzle group after the K data has been transmitted. Doing so makes it possible to process the K data in a smooth manner because the second processing device need not convert the resolution of the K data to a resolution that corresponds to the nozzle density of the K nozzle group.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
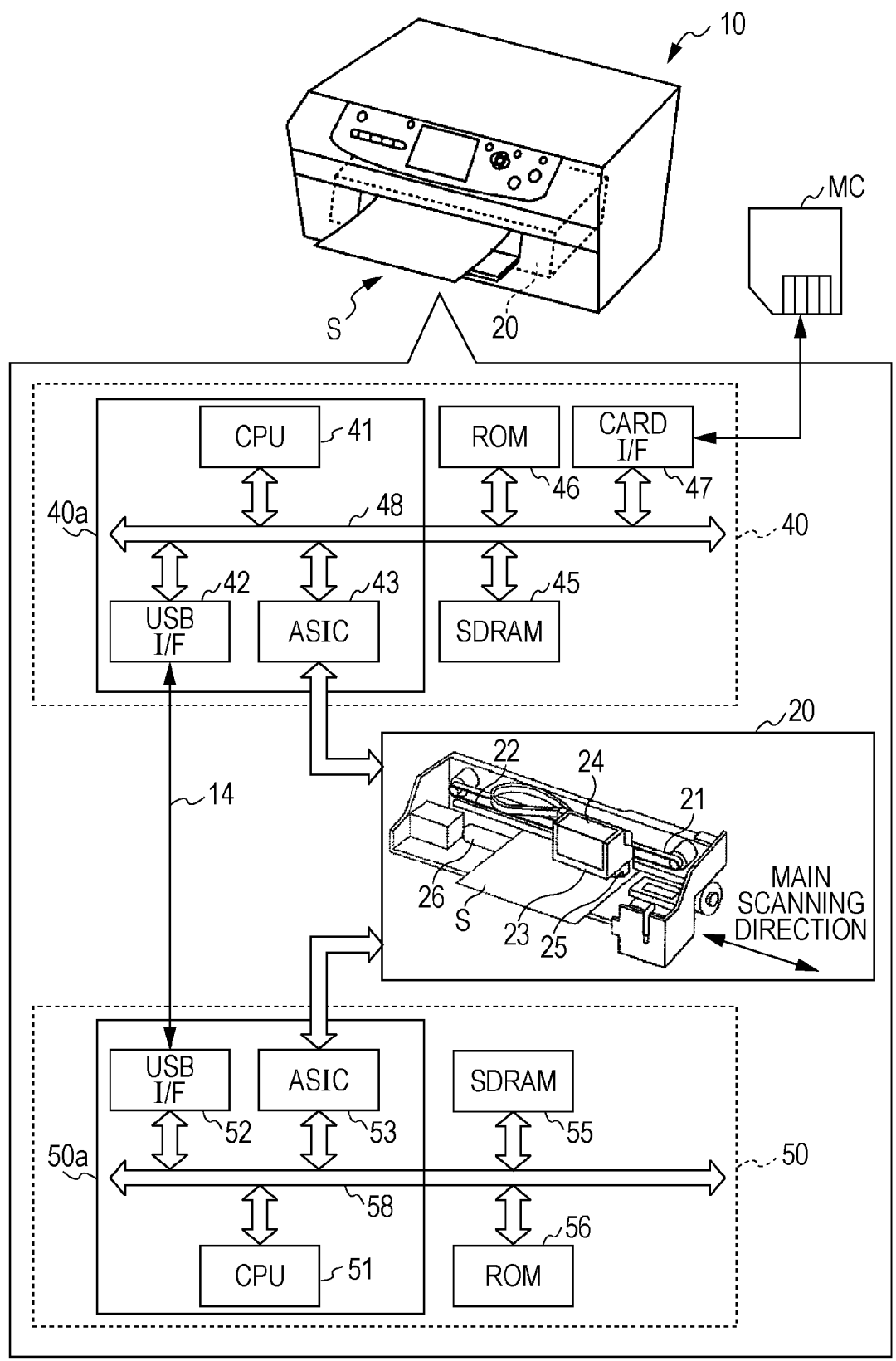
FIG. 1 is a configuration diagram illustrating the overall configuration of an ink jet printer.
Figure 2:
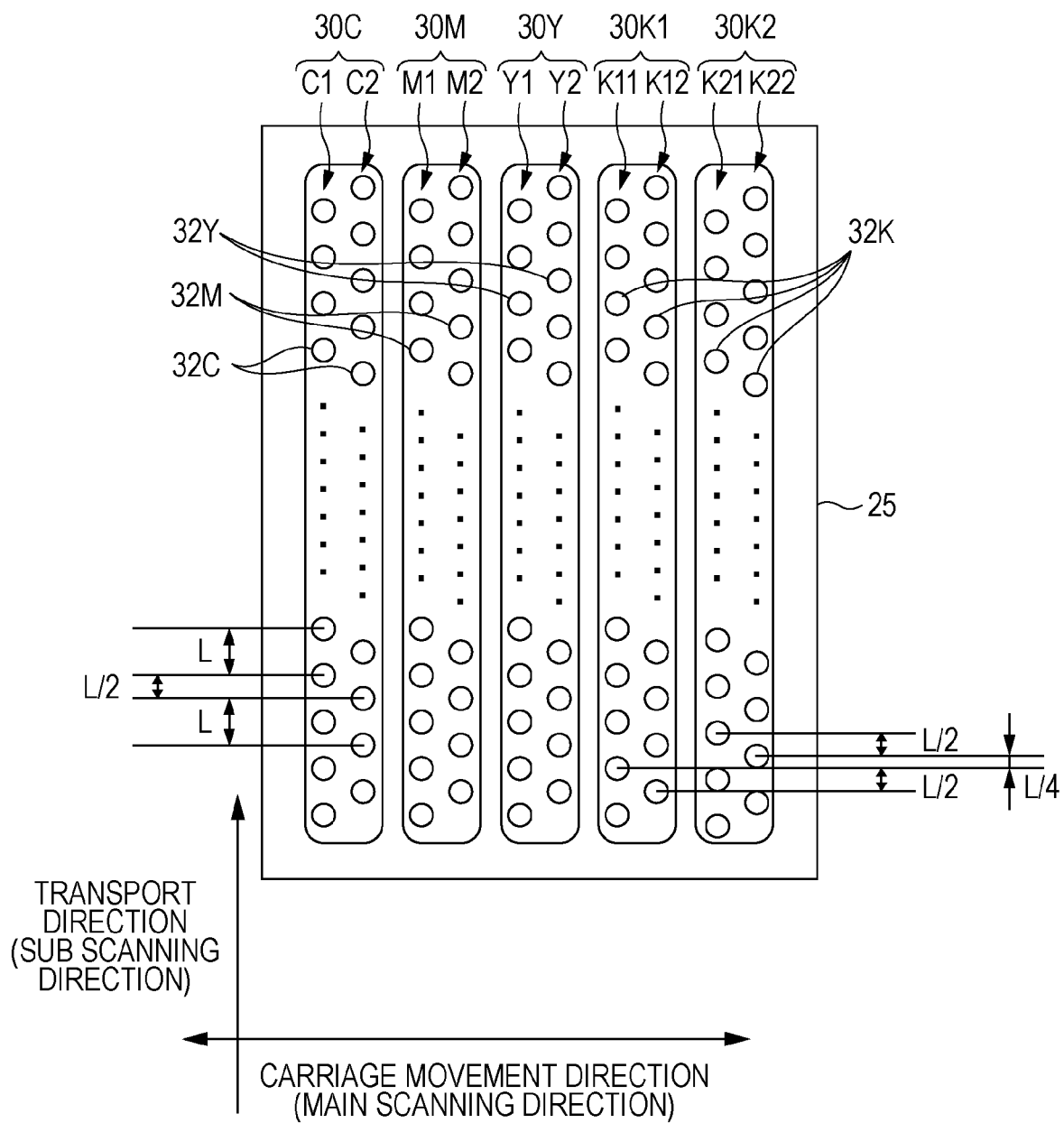
FIG. 2 is a configuration diagram illustrating the overall configuration of a print head.
Figure 3:
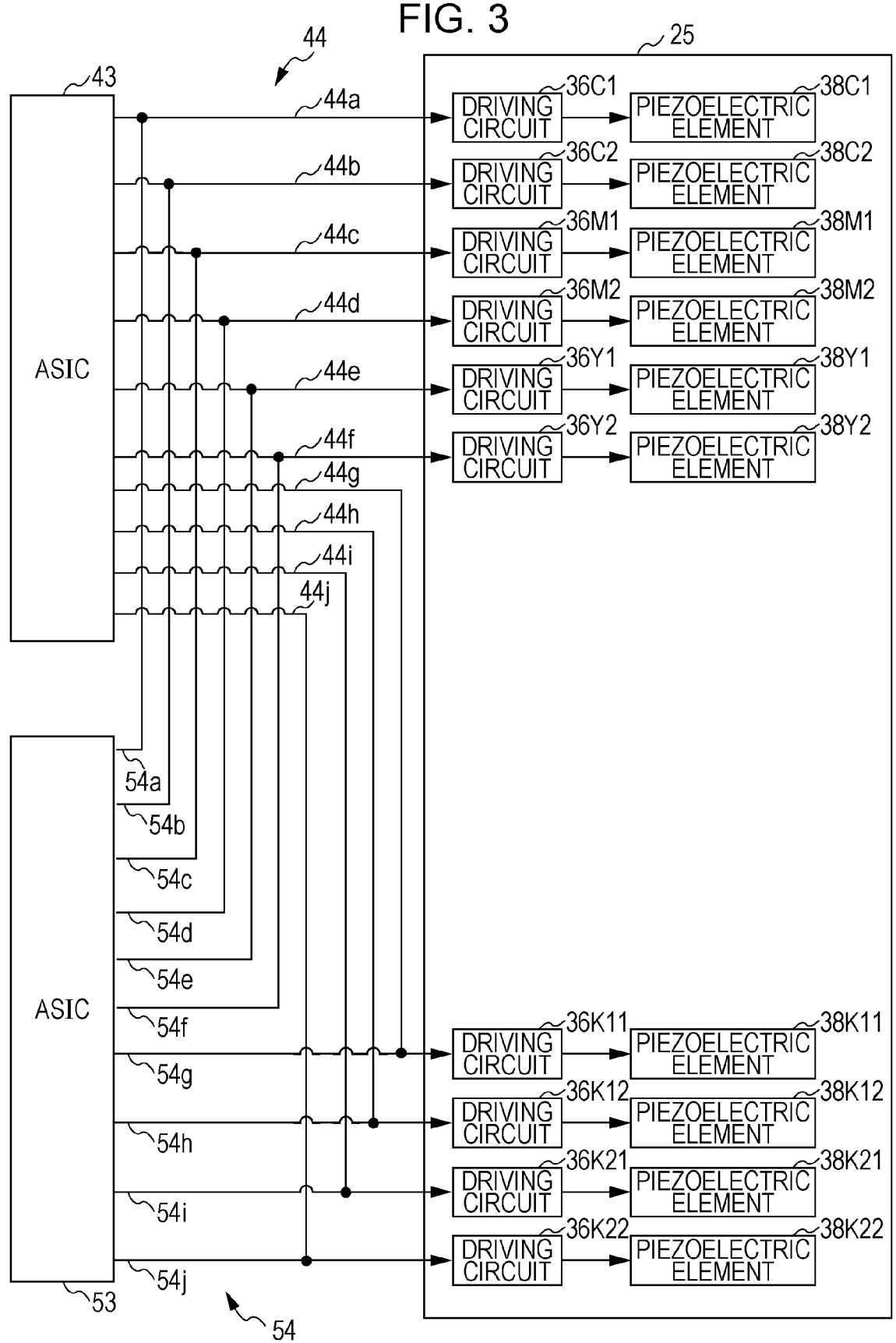
FIG. 3 is a diagram illustrating a connection relationship between ASICs and a print head.

Hereinafter, an embodiment of the invention will be described based on the drawings. FIG. 1 is a configuration diagram illustrating the overall configuration of an ink jet printer 10 that includes an image processing apparatus according to the invention, FIG. 2 is a configuration diagram illustrating the overall configuration of a print head 25, and FIG. 3 is a diagram illustrating a connection relationship between ASICs 43 and 53 and the print head 25. The ink jet printer 10 according to this embodiment includes, as shown in FIG. 1, a printer mechanism 20 that prints an image onto recording paper S, a main controller 40 that executes various types of processes, and a sub controller 50, communicably connected to the main controller 40 via a USB cable 14, that executes various types of processes. Here, the main controller 40 and the sub controller 50 correspond to the image processing apparatus.

The printer mechanism 20 includes: a carriage 23 that is moved back and forth horizontally (that is, in a main scanning direction) along a guide 22 by a belt 21 that is provided tensely in a loop form in the horizontal direction; ink cartridges 24, installed in the carriage 23, that individually hold inks of cyan (C), magenta (M), yellow (Y), and black (K) colors (called simply "C", "M", "Y", and "K" hereinafter) respectively; the print head 25 that ejects the ink onto the recording paper S by applying pressure to each of the inks supplied from each of the ink cartridges 24; and a transport roller 26 that feeds the recording paper S, which has been supplied from the rear, toward the front. As shown in FIG. 2, nozzle groups 30C, 30M, and 30Y, in which respective nozzles 32C, 32M, and 32Y capable of individually ejecting respective CMY inks are arranged along a transport direction of the recording paper S (the sub scanning direction), and nozzle groups 30K1 and 30K2, in which nozzles 32K capable of ejecting black (K) ink are arranged along the sub scanning direction, are formed in the print head 25. Here, the configuration of the nozzle groups will be described using the cyan (C) nozzle group 30C as an example. The nozzle group 30C is configured of two nozzle rows C1 and C2, and the nozzles 32C are disposed in such a manner that the pitch of each of the nozzle rows C1 and C2 is a predetermined length L. Furthermore, the nozzles 32C in the nozzle row C1 and the nozzles 32C in the nozzle row C2 are disposed in a zigzag shape along the sub scanning direction, and the pitch thereof is half of the predetermined length L, or a length L/2. In this embodiment, the predetermined length L is set in such a manner that the dots achieve a resolution of 150 dpi, and a resolution of 300 dpi for the cyan (C) dots is achieved by printing in such a manner that the dots formed by the nozzle row C1 and the dots formed by the nozzle row C2 are arranged in an alternating manner in the sub scanning direction. The magenta (M) nozzle group 30M and the yellow (Y) nozzle group 30Y are configured in the same manner, and thus the resolutions achieved thereby are 300 dpi as well. Likewise, the black (K) nozzle groups 30K1 and 30K2 also form two nozzle rows K11 and K12 and two nozzle rows K21 and K22, respectively. Furthermore, the nozzles 32K of the nozzle group 30K1 and the nozzles 32K of the nozzle group 30K2 are disposed in such a manner that their pitch in the sub scanning direction is half of the length L/2, or in other words, a length L/4. Accordingly, a resolution of 600 dpi for the black (K) dots is achieved by printing in such a manner that the dots formed by the nozzle group 30K1 and the dots formed by the nozzle group 30K2 are arranged in an alternating manner in the sub scanning direction. In this manner, the print head 25 includes a total of ten nozzle rows, and is configured in such a manner that the resolution of the CMY dots is 300 dpi and the resolution of the K dots is 600 dpi. In other words, the nozzle density for K is a higher density than the nozzle density for CMY. In addition, in the print head 25, a voltage is applied to deform piezoelectric elements provided in each of the nozzles, and the ink pressurized as a result thereof is ejected, thus forming the dots on the recording paper S. FIG. 3 illustrates the piezoelectric elements provided in the nozzles 32C of the nozzle row C1, respectively, consolidated as a piezoelectric element 38C1, and the print head 25 includes a driving circuit 36C1 serving as a circuit that applies a voltage to the piezoelectric element 38C1. Likewise, the piezoelectric elements of each of the nozzle rows C2 to K22 are consolidated as piezoelectric elements 38C2 to 38K22, respectively, and the print head 25 includes driving circuits 36C2 to 36K22 serving as circuits that apply voltages to the respective piezoelectric elements 38C2 to 38K22. Note that because the print head 25 includes a total of ten nozzle rows, the print head 25 includes a total of ten driving circuits 36C1 to 36K22.

As shown in FIG. 1, the main controller 40 includes an SOC (System On a Chip) 40a in which a CPU 41 and the like are installed, a ROM 46 in which various types of data, various types of tables, and so on are stored, an SDRAM 45 capable of reading/writing data, and a card interface (I/F) 47 used to connect a memory card MC in which image data such as photographs has been saved. In addition to the CPU 41, the SOC 40a includes a USB interface (I/F) 42 that exchanges information with the sub controller 50, an ASIC 43 that executes various types of processes related to printing processes, controls the printer mechanism 20, and so on, an SRAM (not shown) capable of higher-speed access than the SDRAM 45, and so on; these elements are connected via a bus 48 so as to be capable of exchanging various types of control signals, data, and so on with each other. Note that the bus 48 also functions as an external bus that connects the SOC 40a to the ROM 46, the SDRAM 45, the card I/F 47, and so on. Meanwhile, as shown in FIG. 3, the ASIC 43 is connected to the ten respective driving circuits 36C1 to 36K22 of the print head 25 via ten transmission cables 44 (44a to 44j), and is thus capable of transmitting driving signals to each of the driving circuits 36C1 to 36K22. The main controller 40 inputs various types of operation signals from the printer mechanism 20, inputs various types of control signals transmitted from the sub controller 50 via the USB I/F 42, inputs image data saved in the memory card MC via the card I/F 47, and so on. The main controller 40 also outputs image data, various types of control signals, and so on to the sub controller 50 via the USB I/F 42. The image data inputted from the memory card MC via the card I/F 47 is stored in the SDRAM 45 as 600 dpi RGB data, in accordance with the K dot resolution of the print head 25. Note that when the inputted image data is not RGB data, that image data is stored after being color-converted into RGB data by the CPU 41, whereas when the resolution is not 600 dpi, pixels are generated through interpolation between pixels adjacent to each other, or the pixels are decimated according to a predetermined ratio. Note that the respective values in the RGB data are assumed to be expressed as 256 tones, with values from 0 to 255 that are based on the darkness thereof (that is, 8-bit data).

As shown in FIG. 1, the sub controller 50 is configured in the same manner as the main controller 40, but does not include the card I/F 47; thus the constituent elements of the sub controller 50 are given the same reference numerals as the constituent elements of the main controller 40, but with a value of 10 added thereto. The sub controller 50 inputs image data, various types of control signals, and so on transmitted from the main controller 40 via a USB I/F 52, outputs various types of control signals to the main controller 40 via the USB I/F 52, and so on. Note that the inputted image data is stored in an SDRAM 55. Meanwhile, as shown in FIG. 3, an ASIC 53 is connected to the ten respective driving circuits 36C1 to 36K22 of the print head 25 via ten transmission cables 54 (54a to 54j), and is thus capable of transmitting driving signals to each of the driving circuits 36C1 to 36K22, in the same manner as the ASIC 43.

Figure 4A:
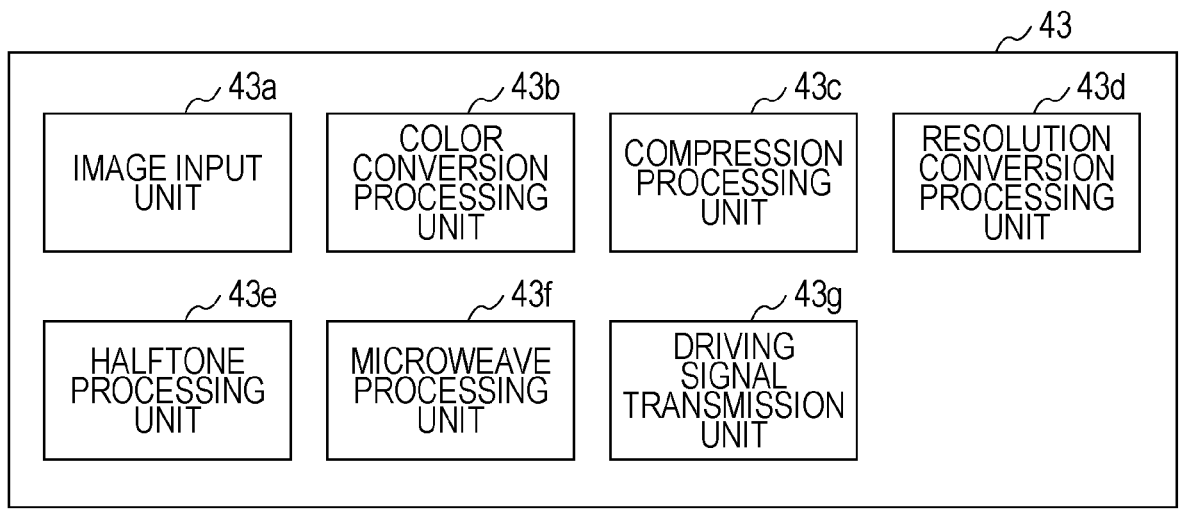
FIGS. 4A and 4B are functional block diagrams of ASICs.
Figure 4B:
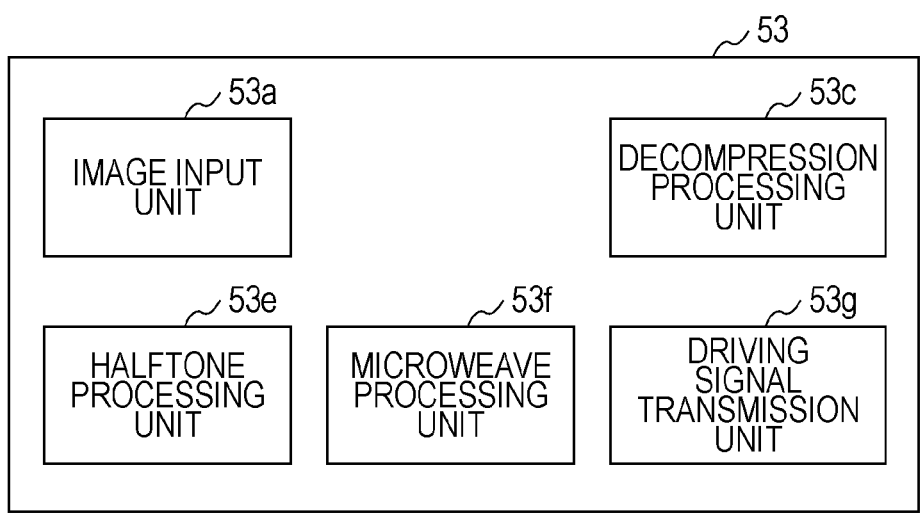

Next, functions of the ASIC 43 of the main controller 40 and the ASIC 53 of the sub controller 50 that are related to the printing process will be described. FIGS. 4A and 4B are functional block diagrams of the ASICs 43 and 53. As shown in FIG. 4A, the ASIC 43 includes an image input unit 43a, a color conversion processing unit 43b, a compression processing unit 43c, a resolution conversion processing unit 43d, a halftone processing unit 43e, a microweave processing unit 43f, and a driving signal transmission unit 43g. The image input unit 43a inputs RGB data stored in the SDRAM 45 at an amount that is required for processing, such as, for example, an amount required for a process for generating one pass's worth of print data for the print head 25. The color conversion processing unit 43b carries out a color conversion process on inputted RGB data, thus converting the RGB data into CMYK data by referring to a color conversion lookup table (LUT) stored in the SDRAM 45. Note that the respective values in the CMYK data obtained through the color conversion process are assumed to be expressed as 256 tones, with values from 0 to 255 that are based on the darkness thereof (that is, 8-bit data). The color conversion processing unit 43b carries out the color conversion process so as not to generate what is known as "composite blacks", where black colors (grays) are expressed using the three CMY inks. Accordingly, when the RGB data to be processed is a value that expresses a black color, the post-processing CMYK data has 0 as a value for C, M, and Y, and only the K data is converted. The compression processing unit 43c extracts the K data from the CMYK data that has undergone the color conversion process, and carries out a compression process on the extracted K data. The extraction of the K data is carried out by obtaining only the K tone values from the CMYK tone values contained in each pixel of the post-color conversion process CMYK data. Meanwhile, the compression process is carried out using a lossless compression technique, and in this embodiment, run-length encoding, in which runs of the same data that continue are encoded and compressed, is employed. Here, because K ink is used only for the printing of comparatively dark colors, in color printing, the rate at which K data occurs is often comparatively lower than the rate at which CMY data occurs. For this reason, when extracting K data from CMYK data and carrying out run-length encoding, continuous white portions with no K data occur more often; accordingly, the compression process can be carried out in a smooth manner, and the compression rate can be improved as well. The resolution conversion processing unit 43d performs resolution conversion by decimating pixels at a predetermined ratio, calculating the average of the tone values of adjacent pixels and replacing one of the pixels with the calculated average value, generating a new pixel through interpolation between adjacent pixels, and so on. The halftone processing unit 43e carries out a halftone process by converting each piece of 8-bit CMYK data into 2-bit binary data. The halftone process is carried out using dithering, error diffusion, or the like. Dithering is a binarization process that sets dots to either "on" or "off" by comparing the size of the tone values of each pixel with thresholds provided by a pre-set dither matrix. Error diffusion, meanwhile, is a technique in which binarization for "on" and "off" is carried out by comparing the size of the tone value of a pixel of interest with a predetermined threshold, and the error, which is the difference between the post-binarization tone value and the original tone value, is diffused to the unprocessed pixels surrounding the pixel of interest at a constant ratio. Accordingly, regardless of which process is used, it is necessary to process each pixel of the CMYK data in the halftone process. The microweave processing unit 43f generates one pass's worth of image data by rearranging the halftone-processed binary data into an order by which the print head 25 forms dots. At this time, in the case where the nozzle pitch is wider than the interval that corresponds to the printing resolution, the dot formation order is set in such a manner that a so-called microweave process, in which the space between lines of dots formed by a previous pass are filled in with lines of dots formed by a following pass, is performed. The driving signal transmission unit 43g generates, as driving signals, pulses of voltages to be applied to the piezoelectric elements 38C1 to 38K22 of the print head 25, based on the one pass's worth of image data, and transmits the respective driving signals to the driving circuits 36C1 to 36K22. These processing units store the processed data in a data buffer (not shown) of the SDRAM 45, perform processing reading out data to be processed from the data buffer of the SDRAM 45, and so on. Although not shown in the drawings, it should be noted that the control of a motor for moving the carriage 23 of the printer mechanism 20 back and forth and a motor that drives the transport roller 26 is carried out by the ASIC 43.

Meanwhile, as shown in FIG. 4B, the ASIC 53 includes an image input unit 53a that inputs image data stored in the SDRAM 55, a decompression processing unit 53c that decompresses the image data compressed using run-length encoding, and a halftone processing unit 53e, a microweave processing unit 53f, and a driving signal transmission unit 53g that respectively perform the same processes as the halftone processing unit 43e, the microweave processing unit 43f, and the driving signal transmission unit 43g of the ASIC 43. As with the processing units of the ASIC 43, these processing units perform processes using a data buffer (not shown) in the SDRAM 55. In this manner, the ASICs 43 and 53 execute processes using the data buffers in the respective SDRAMs 45 and 55, and thus the main controller 40 and the sub controller 50 can execute processes independently of each other.

Figure 5:
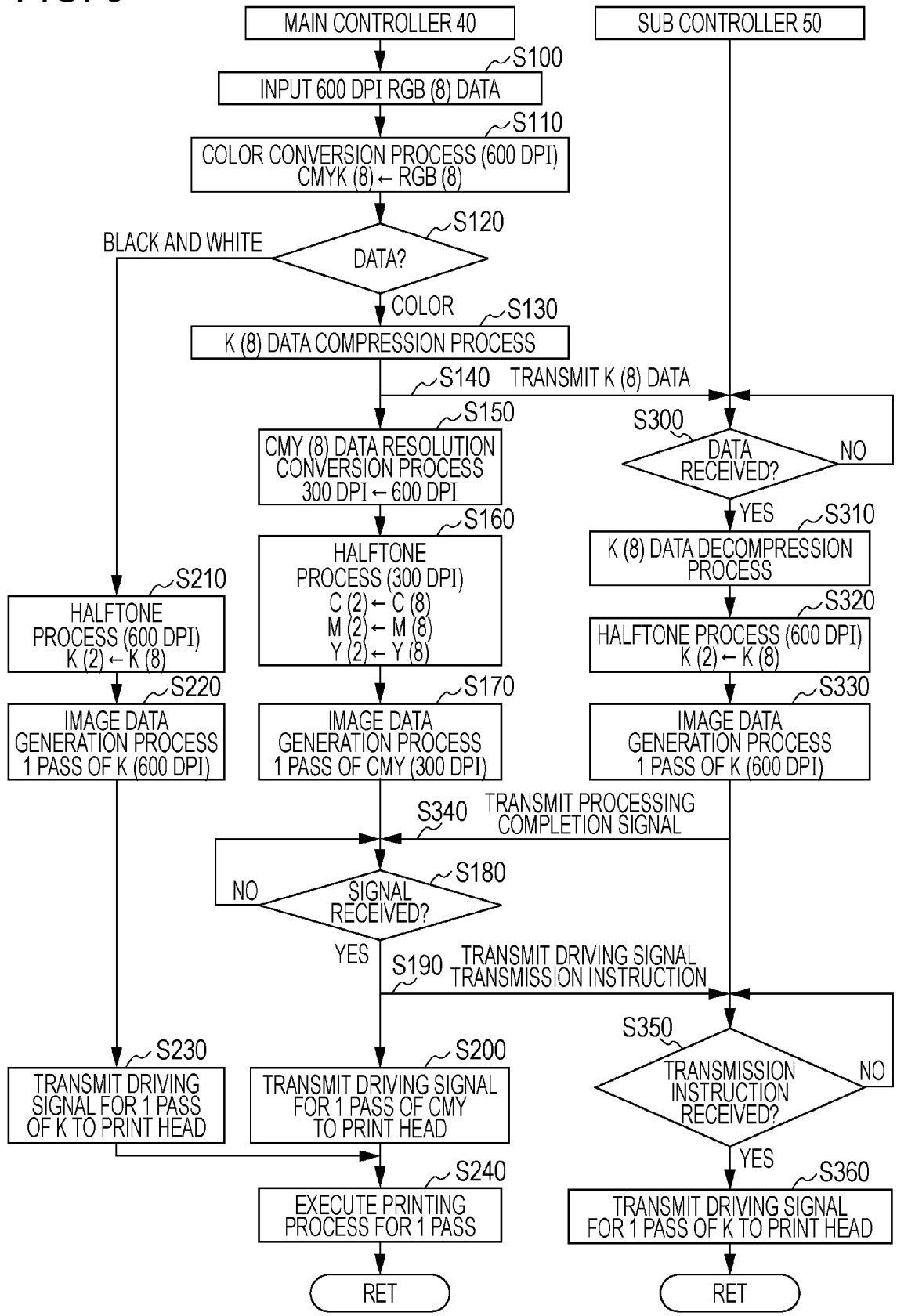
FIG. 5 is a diagram illustrating a print processing sequence.

Next, operations of the ink jet printer 10 according to the embodiment configured in this manner, and particularly operations performed in the case of a printing process based on respective 8-bit R, G, and B data with a resolution of 600 dpi stored in the SDRAM 45, will be described. FIG. 5 is a diagram illustrating a sequence carried out when executing a printing process using the main controller 40 and the sub controller 50. It is assumed that in this sequence, the main controller 40 uses the aforementioned processing functions of the CPU 41, the ASIC 43, and so on as appropriate to execute processes, and that the sub controller 50 does the same. Note that the numerical values in parentheses in this sequence indicate bit numbers of image data. First, of the RGB data stored in the SDRAM 45, the main controller 40 inputs an amount of RGB data necessary for one pass's worth of the printing process (step S100). Next, the color conversion process for color-converting the inputted 8-bit RGB data into 8-bit CMYK data is executed using an LUT (step S110), and it is then determined whether the post-color conversion data is color data or black-and-white data (step S120). As described above, composite blacks are not generated in this embodiment, and thus whether the data is color data or black-and-white data is determined by examining whether or not any of the post-color conversion CMY tone values are 0.

When it has been determined in step S120 that the post-color conversion data is color data, the main controller 40 extracts the K data from the post-color conversion CMYK data and executes a compression process thereon using run-length encoding (step S130), and then transmits the compressed K data to the sub controller 50 (step S140). As described earlier, the K data can be compressed efficiently by using run-length encoding, and thus the compression process can be carried out in a smooth manner, and the time required for transmitting the data can be reduced. Furthermore, because run-length encoding is a form of lossless compression, a reduction in image quality can be prevented from occurring. When the K data has been transmitted, a resolution conversion process is executed on the remaining CMY data (step S150). The CMY data remaining after the color conversion process and the extraction of the K data has a resolution of 600 dpi, but because the CMY dot resolution of the print head 25 is 300 dpi, the resolution of the CMY data is converted to 300 dpi in accordance therewith. After the resolution conversion process has been carried out, the main controller 40 executes the halftone process for converting the 8-bit CMY data into 2-bit binary data (step S160), generates one pass's worth of CMY image data (step S170), and stands by to receive a processing complete signal transmitted from the sub controller 50 (step S180).

Meanwhile, the sub controller 50 stands by for the reception of the K data transmitted by the main controller 40 to be complete (step S300), and executes the decompression process on the received K data (step S310). After the decompression process has been executed, the sub controller 50 executes the halftone process for converting the 8-bit K data into 2-bit binary data (step S320), and generates one pass's worth of K image data (step S330). Note that the transmitted K data is 600 dpi, in accordance with the K resolution, and thus the sub controller 50 can commence the halftone process in a smooth manner without performing a resolution conversion process following the decompression process. When the image data has been generated, the sub controller 50 transmits the processing complete signal to the main controller 40 (step S340), and stands by to receive a driving signal transmission instruction transmitted by the main controller 40 (step S350). In this manner, the processing can be distributed by the sub controller 50 processing the K data. As described thus far, the main controller 40 and the sub controller 50 are capable of performing processes independently, and thus can perform distributed processes in parallel. The halftone processes in particular require each individual pixel to be processed, and although the K data halftone process and the CMY data halftone process cannot be carried out as a single process due to different numbers of pixels arising from different resolutions, the processing efficiency can be improved by distributing those halftone processes and performing them in parallel. Although it is necessary to perform a compression process, a transmission process, and so on for the K data in order to distribute the processing, it should be noted that as described above, the compression process can be carried out smoothly and the data transmission time reduced, and this processing takes a relatively short amount of time compared to the halftone process, which processes each individual pixel; accordingly, the time required for the various processes does not pose a major problem.

Having received the processing complete signal in step S180, the main controller 40 transmits the driving signal transmission instruction to the sub controller 50 (step S190), and then transmits one pass's worth of driving signals for the nozzles 32C, 32M, and 32Y to the print head 25 (step S200). To be more specific, the main controller 40 transmits driving signals generated from one pass's worth of CMY data to the driving circuits 36C1 to 36Y2, respectively, of the print head 25 via the transmission cables 44*a* to 44*f*, respectively. Meanwhile, having received the driving signal transmission instruction in step S350, the sub controller 50 transmits one pass's worth of driving signals for the nozzles 32K to the print head 25 (step S360). To be more specific, the sub controller 50 transmits driving signals generated from one pass's worth of K data to driving circuits 36K11 to 36K22, respectively, of the print head 25 via the transmission cables 54*g* to 54*j*, respectively. When one pass's worth of CMYK data is transmitted to the print head 25 in this manner, the main controller 40 controls the respective motors and executes one pass's worth of the printing process (step S240). These processes are repeatedly executed until there is no next pass of data.

Meanwhile, in the case where it has been determined in step S120 that the post-color conversion data is black-and-white data, processing for CMY data is unnecessary, and thus the main controller 40 executes the halftone process for converting the 8-bit K data into 2-bit binary data (step S210). When this halftone process has been executed, the main controller 40 generates one pass's worth of K image data (step S220), transfers one pass's worth of driving signals for the nozzles 32K to the print head 25 (step S230), and executes one pass's worth of the printing process in step S240. To be more specific, the transmission of the driving signals is carried out by the main controller 40 transmitting driving signals generated from one pass's worth of K data to the driving circuits 36K11 to 36K22, respectively, of the print head 25 via the transmission cables 44*g* to 44*j*, respectively. In this manner, when the data is black-and-white data, which does not require CMY data processing, the K data is processed by the main controller 40 without being transmitted to the sub controller 50. Accordingly, it is unnecessary to spend time on the compression process, transmission process, and so on for the K data, thus making it possible to carry out processing in a smooth manner.

Here, the correspondence relationships between the constituent elements of this embodiment and the constituent elements of the invention will be clarified. The main controller 40 according to the embodiment corresponds to a "first processing device", the sub controller 50 corresponds to a "second processing device", and the print head 25 corresponds to an "ejection head".

According to the ink jet printer 10 of this embodiment as described in detail above, the main controller 40 and the sub controller 50 are connected via a USB interface. When CMYK data obtained by performing a color conversion process on RGB data is color data, the K data is transmitted to the sub controller 50, which generates image data through a K data halftone process, whereas the main controller 40 generates image data through a CMY data halftone process; accordingly, the processing efficiency can be increased by performing the respective halftone processes for the CMY data and the K data, whose numbers of pixels are different, in parallel. Meanwhile, when the CMYK data is black-and-white data, image data is generated by the main controller 40 through a halftone process for K data, and it is thus possible to carry out processing in a smooth manner without transmitting the K data. In addition, the K data is transmitted after being efficiently compressed using run-length encoding, which is a lossless compression technique, and thus the data transmission time and so on can also be reduced without an accompanying drop in image quality. Furthermore, the CMYK data that has undergone the color conversion process corresponds to the resolution of the K nozzles, and thus the sub controller 50 can process the K data in a smooth manner without carrying out a resolution conversion process thereon.

Note that the invention is not intended to be limited in any way to the foregoing embodiment, and it goes without saying that the invention can be carried out in various forms within the technical scope thereof.

Although in the above embodiment the K nozzle density of the print head 25 was described as being high density and the CMY nozzle density was described as being low density, the invention is not limited thereto, and the CMY nozzle density may be high density and the K nozzle density may be low density. In this case, the image data inputted from the memory card MC may be stored in the SDRAM 45 as RGB data corresponding to the CMY dot resolution; meanwhile, the K data extracted in the printing process may be transmitted to the sub controller 50 after converting that data to a resolution of 300 dpi, the sub controller 50 may be provided with a resolution conversion processing unit and may convert the received K data to a resolution of 300 dpi, or the like. Although the nozzle groups 30C, 30M, 30Y, 30K1, and 30K2 were described as containing two nozzle rows each, it should be noted that the invention is not limited thereto, and the nozzle groups may each contain one row or multiple (three or more) rows.

Although the K data was described as being compressed through run-length encoding in the above embodiment, the invention is not limited thereto, and the K data may be compressed using another lossless compression technique, such as Huffman coding. Furthermore, the compression technique is not limited to lossless compression, and a lossy compression technique may be employed instead. Furthermore, the extracted K data may be transmitted as-is, without performing such an compression process thereon. However, it is desirable to carry out a compression process, as in the above embodiment, in order to reduce the data transmission time.

Although the above embodiment described dividing the printing process into a color printing process and a black-and-white printing process after having determined whether the post-color conversion CMYK data is color data or black-and-white data, the invention is not limited thereto, and the processing may be divided based on a color or black-and-white printing instruction from a user.

Although the above embodiment described inputting image data stored in the memory card MC, the invention is not limited thereto, and image data transmitted from a personal computer or the like may be inputted instead. In addition, CMYK data may be transmitted as the image data transmitted from a personal computer or the like, and in such a case, the color conversion processing from RGB data to CMYK data in step S110 and so on may be omitted.

Although the ink colors were described as four colors, or cyan (C), magenta (M), yellow (Y), and black (K), in the above embodiment, the invention is not limited thereto, and five or six colors, including light cyan (LC), light magenta (LM), or the like may be employed, or even more colors may be employed.

Although the controllers were described in the above embodiment as including USB interfaces, the interfaces are not limited thereto, and an interface of another standard, such as an IEEE 1394 interface, may be provided instead.

Finally, although the image processing apparatus is described as being connected to the print head 25 of the ink jet printer 10 in the above embodiment, the invention is not limited thereto, and may instead be connected to an ejection head capable of ejecting ink in a facsimile device or the like.

What is claimed is:

1. An image processing apparatus, connected to an ejection head in which a nozzle group configured of nozzles that eject CMY inks of the CMYK color system and a nozzle group configured of nozzles that eject K ink of the CMYK color system are formed at different nozzle densities, that converts inputted image data into print data and outputs the print data to the ejection head, the apparatus comprising:
    a first processing device that inputs the image data; and
    a second processing device communicably connected to the first processing device via a predetermined communication interface,
    wherein in the ejection head, the K nozzle group is formed having a higher density than the CMY nozzle group;
    when the inputted image data is to be converted into color print data that uses CMYK inks, the first processing device transmits the K data of the CMYK multi-tone data to be processed to the second processing device via the predetermined communication interface and converts the CMY data through binarization performed at the pixel level, and when the inputted image data is to be converted into black-and-white print data that uses only K ink, the first processing device converts the K multi-tone data to be processed through binarization at the pixel level; and
    the second processing device converts the K multi-tone data transmitted from the first processing device through binarization at the pixel level.

2. The image processing apparatus according to claim 1, wherein the first processing device transmits the K data after compressing the K data; and
    the second processing device converts the K data after decompressing the compressed K data.

3. The image processing apparatus according to claim 2, wherein the first processing device compresses the K data using a lossless compression technique.

4. The image processing apparatus according to claim 1, wherein the first processing device converts the inputted image data into the CMYK multi-tone data to be processed at a resolution corresponding to the nozzle density of the K nozzle group, and converts the resolution of the CMY data to a resolution corresponding to the nozzle density of the CMY nozzle group after the K data has been transmitted.

* * * * *